(12) United States Patent
Skibinski et al.

(10) Patent No.: US 8,570,773 B2
(45) Date of Patent: Oct. 29, 2013

(54) POWER CONVERTER SYSTEM AND METHOD

(75) Inventors: Gary L. Skibinski, Milwaukee, WI (US); Ahmed Mohamed Sayed Ahmed, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 486 days.

(21) Appl. No.: 12/787,900

(22) Filed: May 26, 2010

(65) Prior Publication Data

US 2011/0292695 A1 Dec. 1, 2011

(51) Int. Cl.
*H02M 1/12* (2006.01)
*H02M 5/45* (2006.01)

(52) U.S. Cl.
USPC .............................................. 363/37; 363/40

(58) Field of Classification Search
USPC ....................... 363/34, 37, 39, 40, 95, 97, 131
See application file for complete search history.

(56) References Cited

U.S. PATENT DOCUMENTS

| | | | | |
|---|---|---|---|---|
| 5,831,842 A * | 11/1998 | Ogasawara et al. | ............. | 363/40 |
| 7,095,636 B2 * | 8/2006 | Sarlioglu | ............. | 363/39 |
| 7,599,196 B2 * | 10/2009 | Alexander | ............. | 363/13 |
| 8,115,444 B2 * | 2/2012 | De et al. | ............. | 318/801 |
| 2010/0067272 A1 * | 3/2010 | Alexander | ............. | 363/123 |
| 2010/0172162 A1 * | 7/2010 | Tallam et al. | ............. | 363/37 |

* cited by examiner

*Primary Examiner* — Adolf Berhane
(74) *Attorney, Agent, or Firm* — Fletcher Yoder, P.C.; Alexander R. Kuszewski; John M. Miller

(57) ABSTRACT

A three-phase power converter includes a converter configured to convert a three phase AC power input to a DC power output, the DC power output being provided to high and low sides of a DC bus, and an inverter coupled to the DC bus and configured to convert the DC power to a three phase AC output. The inverter comprises three legs and each leg comprises a pair of solid state switches and a respective output therebetween. The power converter further includes a common mode voltage control filter comprising three filter inputs and two filter outputs, each filter input coupled to an output of a respective leg of the inverter and each filter output coupled to a respective side of the DC bus.

18 Claims, 4 Drawing Sheets

POWER CONVERTER SYSTEM AND METHOD

BACKGROUND

The invention relates to power converter systems and more specifically to a system and method for controlling common mode voltages generated in power converter systems.

Typically, a three phase power converter system includes a power source that generates variable frequency AC input power, a rectifier, an inverter and a load. The rectifier operates to convert the AC input power to corresponding DC power. The inverter operates to convert the DC power to AC output power of a desired frequency. The AC output power is used to drive a load such as a motor.

The rectifier and inverter typically include switching devices such as solid state switches (e.g., insulated gate bipolar transistors) and diodes. In rectifiers or inverters that employ solid state switches, the switching operation is performed in a controlled fashion to obtain a desired output power. The switches may be controlled using a control system, which typically includes a control circuit based on a processor, such as a microprocessor, and drive circuitry for driving the gates of the switches.

Common mode voltages are typically generated due to the switching operation of the inverter. Under various operating conditions, these common mode voltages can become fairly high in amplitude and can potentially reach levels that are beyond the insulation ratings of the motor windings (or other load rating). Consequently, running of the load in a manner resulting in such common mode voltages can risk damaging the load or decrease its life expectancy.

A variety of modified power converter designs have been developed to reduce or filter the common mode voltages arising out of the switching of the inverter in such power converter systems. However, the modified power converter designs either fail to reduce common mode voltage to satisfactory levels or introduce other disadvantages. For example, some modified power converter designs attempt to reduce the levels of common mode voltages by controlling the pulsing on and off of the solid state switching devices within the power converters.

However, such modified power converters are more complicated to operate and control, achieve their results at a cost to the power converters' modulation indices and/or total harmonic distortion levels of voltage and current, and in any event fail to substantially reduce the common mode voltages.

Other modified power converter designs attempt to compensate for and nullify the common mode voltages by producing negative voltages through the use of additional switches, or through the use of isolation transformers. However, the use of additional switches can increase the complexity of controlling operation of the power converters, and can increase the cost of the power converters by increasing the number of circuit components.

Further, where transformers are employed, the transformers must be rated to handle the common mode voltage levels. Also, the use of such transformers increases the cost of the power converters and, due to the size of the transformers, can increase the bulkiness of the power converters.

Other techniques require modifications that reconfigure the power converter structure to render the mid point of the DC bus available to the user. Such a provision is not available in a standard power converter. Other techniques also require the neutral point of the load such as a motor to be accessible and connected to the power converter which is not available. In particular, this configuration is not applicable to motors with a Delta connected stator windings.

Therefore, there is a need to design a common mode filter to reduce the common mode voltages in a way that does not increase the complexity of the design, the cost, or the size of the power converters. At the same time, it is also desirable to design the common mode filter in a way such that it can be easily fitted with standard power converters.

BRIEF DESCRIPTION

Briefly, according to one embodiment of the invention, a three-phase power converter is provided. The three phase power converter comprises a converter configured to convert a three phase AC power input to a DC power output, the DC power output being provided to high and low sides of a DC bus, an inverter coupled to the DC bus and configured to convert the DC power to a three phase AC output. The inverter comprises three legs and each leg comprises a pair of solid state switches and a respective output therebetween. The power converter further includes a common mode voltage control filter comprising three filter inputs and two filter outputs, each filter input coupled to an output of a respective leg of the inverter and each filter output coupled to a respective side of the DC bus.

In another embodiment, a three-phase power converter is provided. The power converter comprises a converter configured to convert a three phase AC power input to a DC power output, the DC power output being provided to high and low sides of a DC bus and an inverter coupled to the DC bus and configured to convert the DC power to a three phase AC output, wherein the inverter comprises three legs and each leg comprises a pair of solid state switches and a respective output therebetween. The power converter further includes a common mode voltage control filter comprising three filter inputs and two filter outputs, each filter input coupled to an output of a respective leg of the inverter and each filter output coupled to a respective side of the DC bus. The common mode voltage control filter also includes a resistive, capacitive, inductive network and a capacitor network coupled to the resistive, capacitive, inductive network.

In another embodiment, a three-phase power converter is provided. The power converter comprises a converter configured to convert a three phase AC power input to a DC power output, the DC power output being provided to high and low sides of a DC bus and an inverter coupled to the DC bus and configured to convert the DC power to a three phase AC output, wherein the inverter comprises three legs and each leg comprises a pair of solid state switches and a respective output therebetween. The power converter further includes a common mode voltage control filter comprising three filter inputs and two filter outputs, each filter input coupled to an output of a respective leg of the inverter and each filter output coupled to a respective side of the DC bus. The common mode voltage control filter also includes a resistive, capacitive, inductive network and a capacitor network coupled to a common node of the resistive, capacitive, inductive network.

In another embodiment, a common mode voltage control filter adapted for use in a power converter system is provided. The filter comprises three filter inputs and two filter outputs, a resistive, capacitive, inductive network and a capacitor network coupled to a common node of the resistive, capacitive, inductive network.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
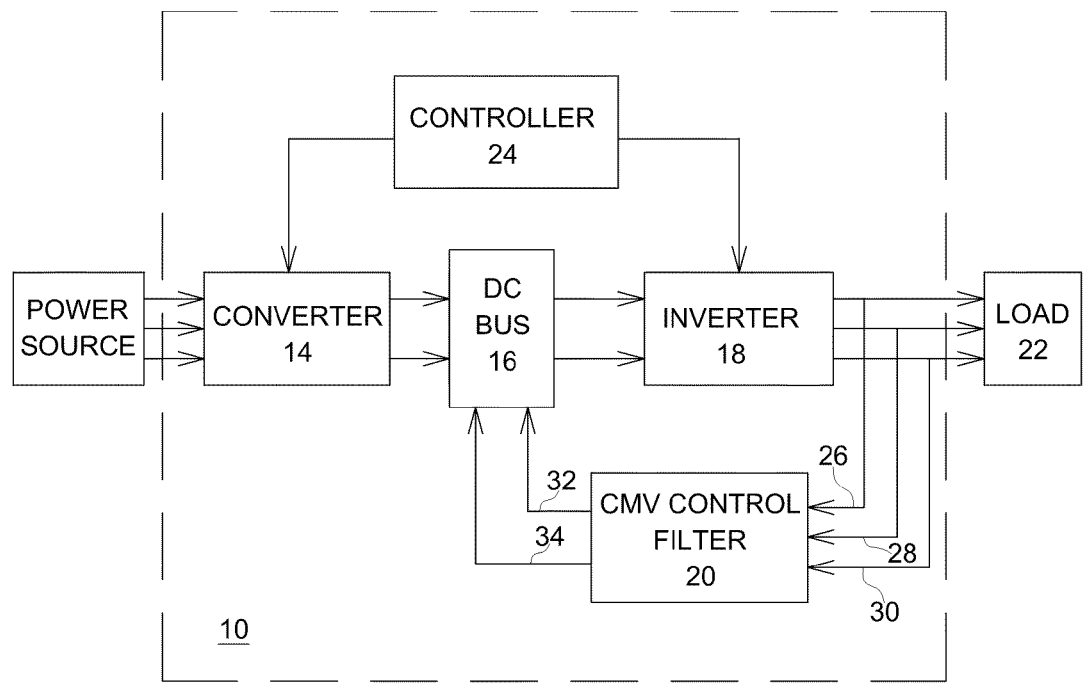
FIG. 1 is a block diagram of an embodiment of a power converter system implemented according to one aspect of the present invention.

Turning now to the drawings, and referring first to FIG. 1, a power converter system is illustrated. Power converter system 10 includes a converter 14, a DC bus 16, an inverter 18, a common mode voltage (CMV) control filter 20, and a controller 24. The output of the power converter system is provided to load 22. Each block is described in further detail below.

Power source 12 provides a three phase input power to the power converter system. The three phase power is provided on three separate input lines as a first, second and third phase to the power converter system 10. Converter 14 is configured to convert three phase electrical power into corresponding DC power.

In one exemplary embodiment, the converter comprises six switching devices. The switches may be active devices such as solid state switches or the converter can be constructed using diodes. For a converter that employs active switches, switching operation is controlled by controller 24. The DC power supply is provided to a high and low side of DC bus 16.

Inverter 18 is coupled to high (+) and low (−) sides of the DC bus and is configured to convert DC power to a corresponding AC output power. In one embodiment, the inverter comprises three legs and each leg comprises a pair of solid state switches and a respective output therebetween.

The operation of the switches of the inverter is controlled by the controller 24. However, it may be noted that the switching operation of the inverter may be controlled separately. The output AC power of the inverter is provided to the load. In one embodiment, load 22 is a three phase AC motor.

The CMV control filter 20 is configured to control and reduce common mode voltages generated by the switching action of the inverter. The CMV control filter 20 is coupled to the output of the inverter via three filter inputs 26, 28 and 30. The CMV control filter is also coupled to the DC bus via two filter outputs 32 and 34. The CMV filter is described in further detail below.

Figure 2:
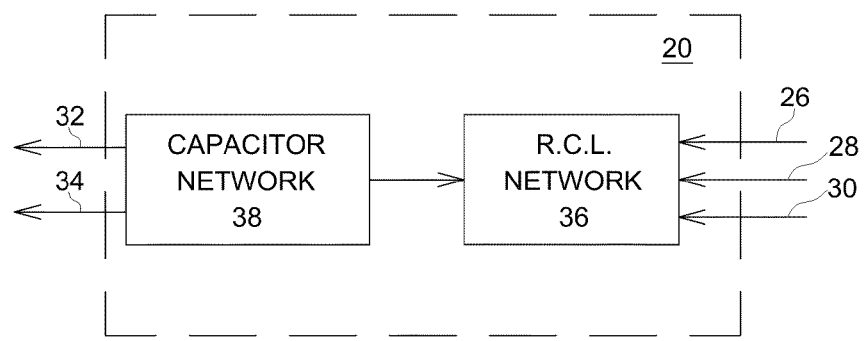
FIG. 2 is a block diagram of an exemplary embodiment of a common mode voltage control filter implemented according to one aspect of the present invention.

FIG. 2 is a block diagram of a CMV control filter implemented according to one aspect of the invention. The CMV filter is adapted to operate with power converter systems. The CMV control filter includes a resistive, capacitive, inductive network 36 and a capacitor network 38. Each block is described in further detail below.

The resistive, capacitive, inductive network 36 is coupled to an output of the power converter system using three filter inputs 26, 28 and 30. In one embodiment, the resistive, capacitive, inductive network 36 includes an LC filter. In another embodiment, the resistive, capacitive, inductive network 36 includes a notch filter.

The capacitor network is coupled to the resistive, capacitive, inductive network 36 at a common node. The capacitor network is also coupled to the high and low sides of the DC bus of the power converter system using two filter outputs 32 and 34 respectively. In one embodiment, the capacitor network includes two capacitors.

As described above, the common mode voltage control filter may be implemented using an LC filter or a notch filter. The manner in which a power converter system is implemented using a common mode voltage control filter with a LC filter is described in detail below.

Figure 3:
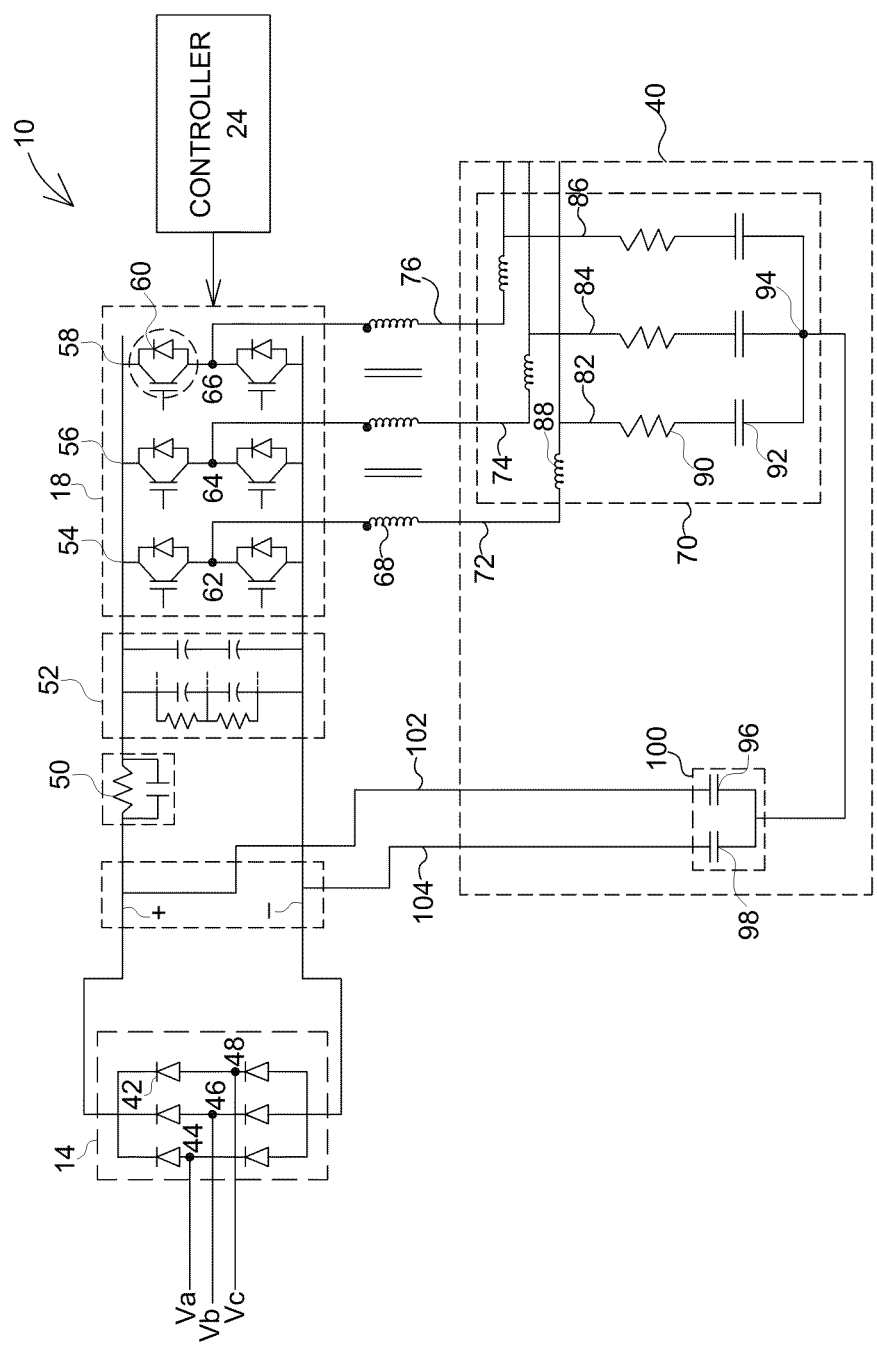
FIG. 3 is a block diagram of an exemplary embodiment of a common mode voltage control filter including an LC filter.

FIG. 3 is a circuit diagram of a power converter system implementing a common mode voltage control filter according to one aspect of the invention. The common mode voltage control filter 40 is implemented using an LC filter. The power converter system 10 operates in two stages. The first stage comprises the converter 14 that converts the three phase AC input power represented by $V_a$, $V_b$ and $V_c$ into direct current (DC) power. The second stage is an inverter 18 that converts the DC power into three-phase AC output power of a desired frequency and amplitude.

Converter 14 includes three legs, each leg having one pair of diodes represented generally by reference numeral 42. Each pair of diodes is coupled in series at nodes 44, 46 and 48 respectively. The three phase input power $V_a$, $V_b$ and $V_c$ are provided as inputs to the converter at nodes 44, 46 and 48 respectively.

Although converter 14 is shown to employ diodes, in alternate embodiments the converter can be constructed using solid state switches such as insulated-gate bipolar transistors (IGBTs), silicon-controlled rectifiers (SCRs), gate turn-off thyristors (GTOs), gate commutated thyristors (GCTs), or other switching devices.

The converter operates to convert the three phases of AC power $V_a$, $V_b$ and $V_c$ to corresponding DC power. The DC power is provided to high and low sides of DC bus 16. The high side of DC bus 16 is coupled to a pre-charge relay 50. The pre-charge relay 50 includes a resistor and a capacitor connected in parallel. When the output power is being provided to the load, the capacitor charges and discharges when the voltage on the DC bus saturates. Filter 52 is configured to filter out ripple current produced by converter 14.

Inverter 18 receives the DC power from DC bus 16. Inverter 18 includes three legs 54, 56 and 58, each leg employing a pair of solid state switches referenced generally by reference numeral 60, such as IGBTs. Nodes 62, 64 and 68 are formed between each pair of solid state switches and form the output of the inverter. In operation, the solid state switches of the inverter are turned ON and OFF appropriately to produce a desired AC output power waveform. The switching operation of the inverter is controlled by controller 24. Output terminals 62, 64 and 66 generate a first, second and third AC power output. The three phase output is provided to the load via three inductors generally represented by reference numeral 68.

Although inverter 18 is shown to employ IGBTs, in alternate embodiments the inverter can employ other solid state semiconductor-based switching devices such as silicon-controlled rectifiers (SCRs), gate turn-off thyristors (GTOs), gate commutated thyristors (GCTs), or other switching devices.

The CMV control filter 40 includes three filter inputs 72, 74 and 76 coupled to the outputs 62, 64 and 66 respectively. In the embodiment of FIG. 3, the CMV control filter 40 includes an LC filter 70. The LC filter 70 includes three legs 82, 84 and

86, each leg including an inductor 88, a resistor 90 and a capacitor 92. The three legs are also coupled together at common node 94.

The CMV control filter further includes a capacitor network 100 comprising two capacitors 96 and 98. The capacitor network is coupled to the high and low sides of the DC bus via filter outputs 102 and 104. The capacitor network is coupled to the LC filter at the common node 94.

Figure 4:
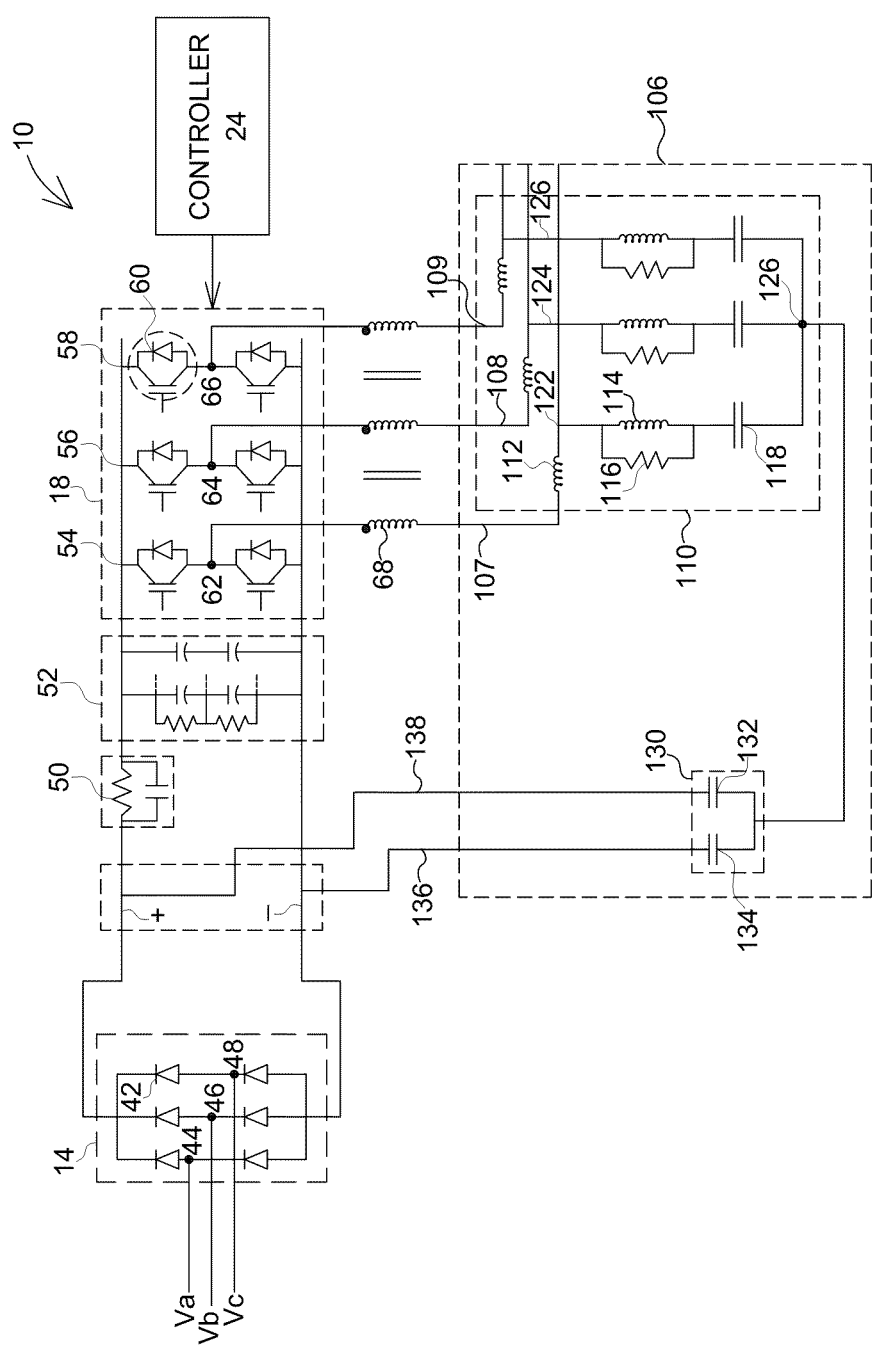
FIG. 4 is a block diagram of an exemplary embodiment of a common mode voltage control filter including a notch filter.

The CMV control filter 20 described above is implemented using an LC filter. FIG. 4 is a circuit diagram of the power converter system implemented using a CMV control filter constricted using a notch filter. The CMV control filter 106 includes three filter inputs 107, 108 and 109 coupled to corresponding outputs 62, 64 and 66 respectively. The notch filter 110 comprises three legs 120, 122 and 124 respectively. Each leg includes an inductor 112, an inductor 114 and a resistor 116 coupled in parallel and capacitor 118. Each leg is also coupled together at common node 126.

The CMV control filter includes a capacitor network 130 comprising two capacitors 132 and 134. The capacitor network is coupled to the high and low sides of the DC bus via filter outputs 136 and 138. The capacitor network is coupled to the notch filter at common node 126.

The CMV control filter controls the common mode voltage arising due to the switching action of the inverter by circulating the current within the filter itself. In addition, since the filter is not coupled to the ground, circulating ground currents are substantially reduced.

Figure 5:
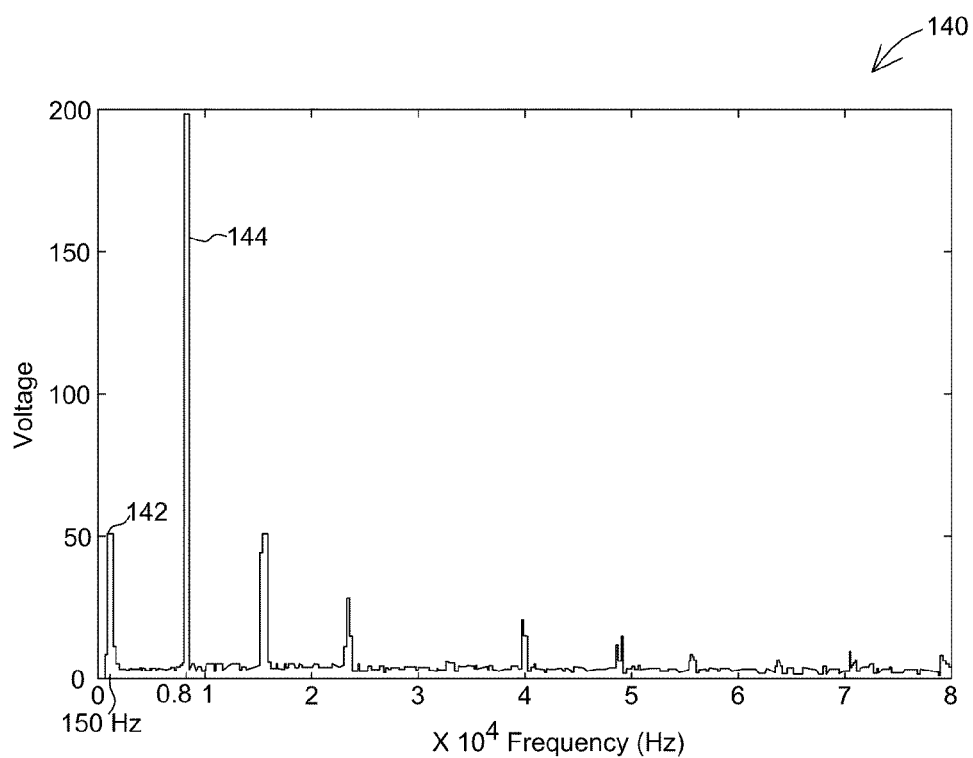
FIG. 5 is a graph depicting a common mode voltage present at an output of a conventional power converter system.

FIG. 5 is a graph illustrating a common mode voltage present at the output of a power converter system that does not implement a CMV control filter. Graph 140 represents the common mode voltage on the X-axis and the switching frequencies of the inverter and the converter (employed by the power converter system) on the Y-axis. As can be seen, in this example, when the rectifier switches at a frequency of 180 Hz, the corresponding CMV 142 generated is about 50V. Similarly, when the inverter switched at a switching frequency of about 8 KHz, a high CMV represented by 144 is produced. The common mode voltage 144 produced at the output of the power converter system is about 200 V. The common mode voltage can be substantially reduced by employing a CMV control filter as is shown below.

Figure 6:
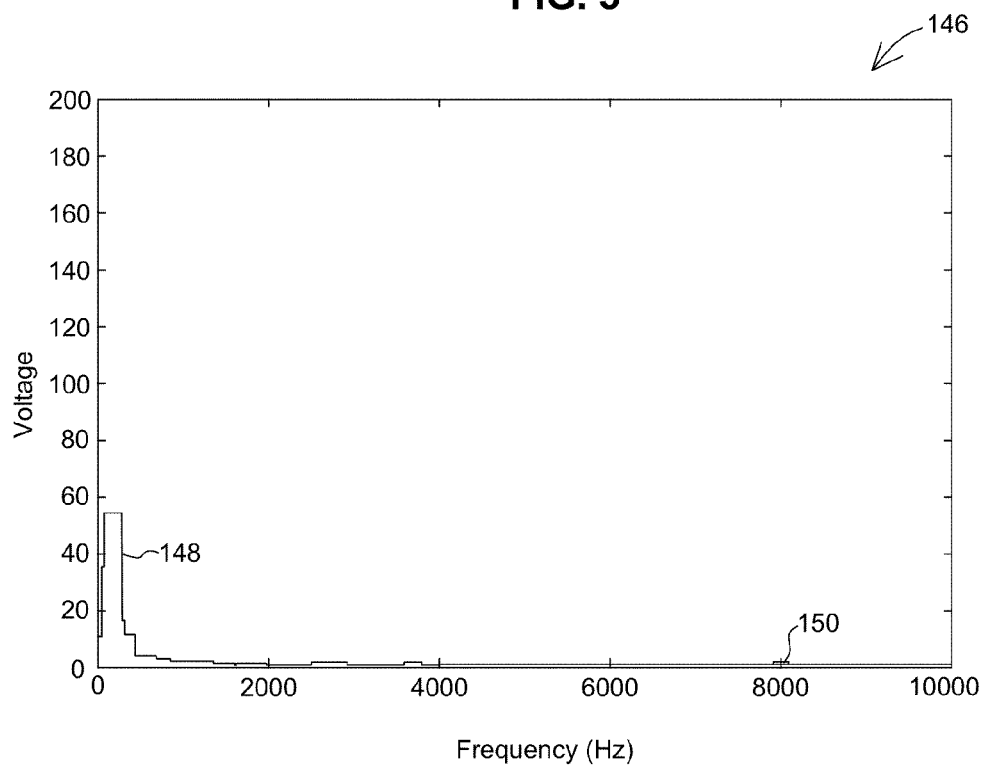
FIG. 6 is a graph depicting a common mode voltage present at an output of a power converter system implementing a common mode voltage control filter.

FIG. 6 is a graph illustrating a common mode voltage present at the output of a power converter system that implements a CMV control filter. Graph 146 represents the common mode voltage on the X-axis and the switching frequencies of the inverter and the converter (employed by the power converter system) on the Y-axis. As can be seen from the graph, in this example, when the rectifier switches at a frequency of 180 Hz, the corresponding CMV 148 generated is still about 50V. However, due to the CMV control filter coupled to the inverter, the CMV 150 generated at the output of the power converter system due to the inverter switching action is significantly reduced, in this example to about 3 V.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A three-phase power converter comprising:
   a converter configured to convert a three phase AC power input to a DC power output, the DC power output being provided to high and low sides of a DC bus;
   an inverter coupled to the DC bus and configured to convert the DC power to a three phase AC output, wherein the inverter comprises three legs and each leg comprises a pair of solid state switches and a respective output therebetween; and
   a common mode voltage control filter comprising three filter inputs and two filter outputs, each filter input coupled to an output of a respective leg of the inverter and each filter output coupled to a respective side of the DC bus; the common mode voltage control filter comprising an inductor, a resistor, and a capacitor in series for each filter input.

2. The three-phase power converter of claim 1, wherein the inductor, the resistor, and the capacitor comprise an LC filter.

3. The three-phase power converter of claim 1, wherein the inductor, the resistor, and the capacitor comprise a notch filter.

4. The three-phase power converter of claim 1, wherein the common mode voltage control filter is coupled to a capacitor network extending across the DC bus.

5. The power converter of claim 1, wherein the each filter input is coupled to a respective leg of the inverter via an inductor.

6. The power converter of claim 1, further comprising a precharge relay coupled to the high side of the DC bus.

7. A three-phase power converter comprising:
   a converter configured to convert a three phase AC power input to a DC power output, the DC power output being provided to high and low sides of a DC bus;
   an inverter coupled to the DC bus and configured to convert the DC power to a three phase AC output, wherein the inverter comprises three legs and each leg comprises a pair of solid state switches and a respective output therebetween; and
   a common mode voltage control filter comprising three filter inputs and two filter outputs, each filter input coupled to an output of a respective leg of the inverter and each filter output coupled to a respective side of the DC bus; the common mode voltage control filter comprising an inductor, a resistor, and a capacitor in series for each filter input; wherein the common mode voltage control filter is coupled to a capacitor network extending across the DC bus.

8. The three-phase power converter of claim 7, wherein the capacitor network is coupled to a common node of the inductor, the resistor, and the capacitor in series for each filter input.

9. The three-phase power converter of claim 7, wherein the inductor, the resistor, and the capacitor comprise an LC filter.

10. The three-phase power converter of claim 7, wherein the inductor, the resistor, and the capacitor comprise a notch filter.

11. The three-phase power converter of claim 7, wherein the capacitor network comprises at least two capacitors.

12. A three-phase power converter comprising:
   a converter configured to convert a three phase AC power input to a DC power output, the DC power output being provided to high and low sides of a DC bus;
   an inverter coupled to the DC bus and configured to convert the DC power to a three phase AC output, wherein the inverter comprises three legs and each leg comprises a pair of solid state switches and a respective output therebetween; and
   a common mode voltage control filter comprising three filter inputs and two filter outputs, each filter input coupled to an output of a respective leg of the inverter and each filter output coupled to a respective side of the DC bus; the common mode voltage control filter comprising an inductor, a resistor, and a capacitor in series for each filter input; wherein the common mode voltage control filter is coupled to a capacitor network extending across the DC bus, wherein the capacitor network comprises two capacitors and is coupled to a common node of the inductor, the resistor, and the capacitor in series for each filter input.

13. The three-phase power converter of claim 12, wherein the inductor, the resistor, and the capacitor comprise an LC filter.

14. The three-phase power converter of claim 12, wherein the inductor, the resistor, and the capacitor comprise a notch filter.

15. A common mode voltage control filter adapted for use in a power converter system, the filter comprising:
   three filter inputs and two filter outputs;
   an inductor, a resistor, and a capacitor in series for each filter input; and
   a capacitor network coupled to a common node of the inductor, the resistor, and the capacitor in series for each filter input.

16. The common mode voltage control filter of claim 15, wherein the inductor, the resistor, and the capacitor comprise an LC filter.

17. The common mode voltage control filter of claim 15, wherein the inductor, the resistor, and the capacitor comprise a notch filter.

18. The common mode voltage control filter of claim 15, wherein the capacitor network comprises at least two capacitors.

* * * * *